Oct. 6, 1970         W. J. FUHRMAN         3,531,976
COLD ROLLING OF FINE PITCH HERRINGBONE GEARS
Filed Nov. 27, 1967                       7 Sheets-Sheet 1

INVENTOR:
WILLIAM J. FUHRMAN
BY
ATTORNEYS

Fig. 2

HERRINGBONE DIE TOOTH DATA

| | |
|---|---|
| No. Teeth | 170 |
| Normal Diametral Pitch | 23.268707 |
| Transverse Diametral Pitch | 20.228744 |
| Helix Angle | 29° 36' 59" |
| Transverse Pressure Angle | 23° 37' 55" |
| Normal Pressure Angle | 20° 49' 35" |
| Lead | 46.444401 |
| Addendum | .0542 |
| Dedendum | .0535 |
| Root Diameter | 8.296883 |
| Base Circle | 7.699948 |
| Pitch Diameter | 8.403883 |
| Major Diameter | 8.512283 |
| Normal Tooth Thickness @ P.D. | .068872 |
| Whole Depth | .1077 |
| Transverse Circular Pitch | .155303 |
| Normal Circular Pitch | .135013 |
| Dim. Over .080 Pins | 8.535126 |
| Crest Radius | .015 |
| Root Radius | .016 |

INVENTOR:
WILLIAM J. FUHRMAN
BY
ATTORNEYS.

Fig. 3-A
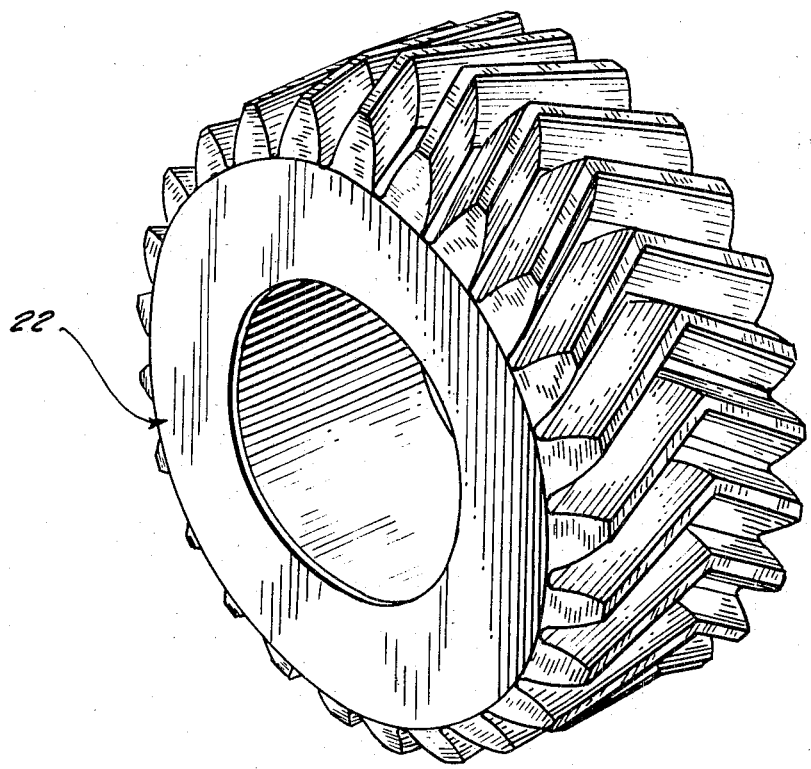
Fig. 3-B
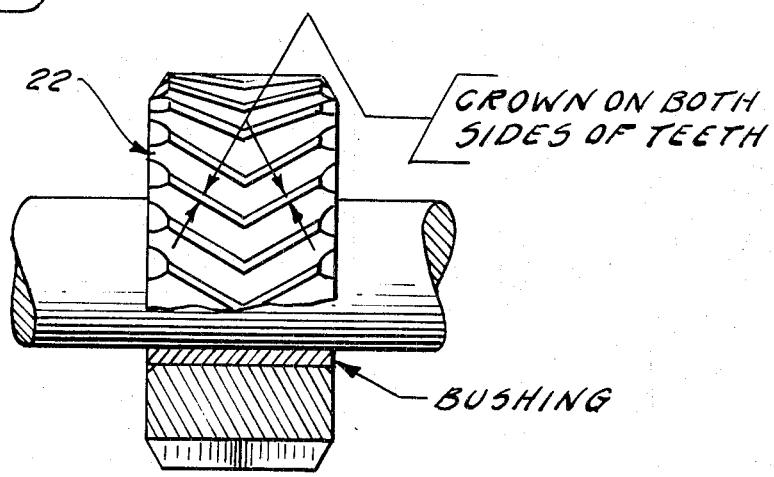

Oct. 6, 1970        W. J. FUHRMAN        3,531,976

COLD ROLLING OF FINE PITCH HERRINGBONE GEARS

Filed Nov. 27, 1967                                 7 Sheets-Sheet 4

Fig. 4

HERRINGBONE GEAR TOOTH DATA

| | |
|---|---|
| NUMBER TEETH | 25. |
| NORMAL DIAMETRAL PITCH | 23. |
| TRANSVERSE DIAMETRAL PITCH | 19.9175 |
| HELIX ANGLE | 30° |
| NORMAL PRESSURE ANGLE | 22° 30' |
| TRANSVERSE PRESSURE ANGLE | 25° 33' 4" |
| LEAD | 6.83005 |
| ADDENDUM | .0535 |
| DEDENDUM | .0542 |
| MINOR DIAMETER | 1.1468 |
| BASE CIRCLE | 1.13234 |
| PITCH DIAMETER | 1.2552 |
| MAJOR DIAMETER | 1.3622 |
| NORMAL TOOTH THICKNESS @ P.D. | .06630 |
| WHOLE DEPTH | .1077 |
| TRUE FORM DIAMETER | 1.16532 |
| TRANSVERSE CIRCULAR PITCH | .15773 |
| MAXIMUM ROLL DIAMETER | 1.3422 |
| NORMAL CIRCULAR PITCH | .136591 |
| ROOT RADIUS | .015 |
| CREST RADIUS | .015 |

INVENTOR:
WILLIAM J. FUHRMAN.
BY
ATTORNEYS.

SECTION THROUGH APEX IN PLANE OF ROTATION (TRANSVERSE)

SECTION .18" FROM APEX, NORMAL TO HELIX.

SECTION THROUGH APEX @ PITCH DIAMETER.

United States Patent Office 3,531,976
Patented Oct. 6, 1970

3,531,976
COLD ROLLING OF FINE PITCH HERRINGBONE GEARS
William J. Fuhrman, Detroit, Mich., assignor to Ford Motor Company, Dearborn, Mich., a corporation of Delaware
Filed Nov. 27, 1967, Ser. No. 685,872
Int. Cl. B21h 5/02
U.S. Cl. 72—478  1 Claim

ABSTRACT OF THE DISCLOSURE

This specification describes gear rolling dies for rolling herringbone gears from a solid gear blank. The dies are in the form of a circular gear having a bipartite construction in which one die part is formed with right-hand helical teeth and the other part is formed with left-hand helical teeth. The die parts are pinned together to form a unitary assembly with the ends of the teeth of one part registering with the ends of the teeth of the other part thereby providing continuous, chevron-shaped gear teeth on the periphery of the die.

The die displaces metal from the gear blank as the gear blank and the die are rotated about parallel axes and the center distance between the axes is closed.

BRIEF SUMMARY OF THE INVENTION

The design advantages of double helical gears for a power transmission mechanism are well known in the gear forming art. For example, the torque transmitting capacity of herringbone gears for any given tooth size is increased substantially and the smoothness and quietness of operation of the gears is superior. This superiority results in part from the elimination of axial thrust forces during dynamic loading of the gear teeth.

In a conventional helical gear driveline the helix angle creates an axial thrust component during dynamic loading of the gearing. Complex bearing devices therefore are required to restrict the end movement of the gearing, and gear mounting clearances are necessary because of the deflection of the gear axis and the pitch cylinder for the gearing.

A herringbone gear manufactured by my improved gear rolling die counteracts the thrust forces normally associated with the gearing. The end thrust of one helix gear portion of the rolled herringbone gear is opposed and balanced by thrust portions acting in the other direction on the companion helix portion. This results in bearing loads of insignificant value and contributes to even distribution of wear. The contact ratio for the conjugate teeth for the two adjacent helices is increased and the noise level is reduced.

Heretofore herringbone gears in power transmission mechanisms have been formed by delicate and time-consuming machining operations. When they are formed from a solid blank, it is necessary to hob the individual gear teeth. This requires the machining of a central relief groove at the center of the gear tooth faces to permit the hobbing tool to complete the cutting operation. The gear teeth, following the hobbing operation, must be shaped. Again the shaper tool must be accommodated in such arrangements by the central relief groove. Without the presence of the groove, complex gear shaping equipment must be used so that the blind apex can be cut. Even aside from the impracticality of such machining operations, the resulting product usually lacks dimensional precisions because of the gear tooth variations and wide machining tolerances. Such machining operations, notwithstanding the foregoing shortcomings, are impractical in mass production gear manufacturing procedures such as is required in automotive vehicle driveline manufacturing facilities.

The improved die of my invention comprises two juxtaposed helical gears formed with opposite helix angles. These are mounted on a common axis and are pinned together. The composite die then is brought into meshing engagement with a workpiece blank with a radial in-feed motion until the full tooth depth of the blank is achieved.

BRIEF DESCRIPTION OF THE FIGURES OF THE DRAWINGS

FIG. 2 is a chart showing the gear tooth data for the die of FIG. 1.

FIG. 3 and 3B show a pinion formed by the die of FIG. 1 with a gear rolling technique.

FIG. 4 is a chart showing the tooth data for the pinion of FIG. 3B.

PARTICULAR DESCRIPTION OF THE INVENTION

Figure 1:
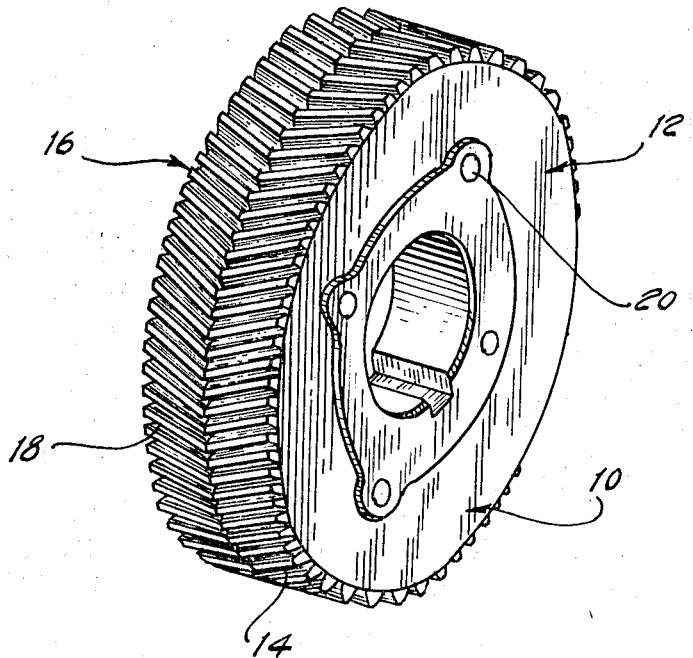
FIG. 1 shows in isometric form a gear rolling die embodying the improvements of my invention.
Figure 8:
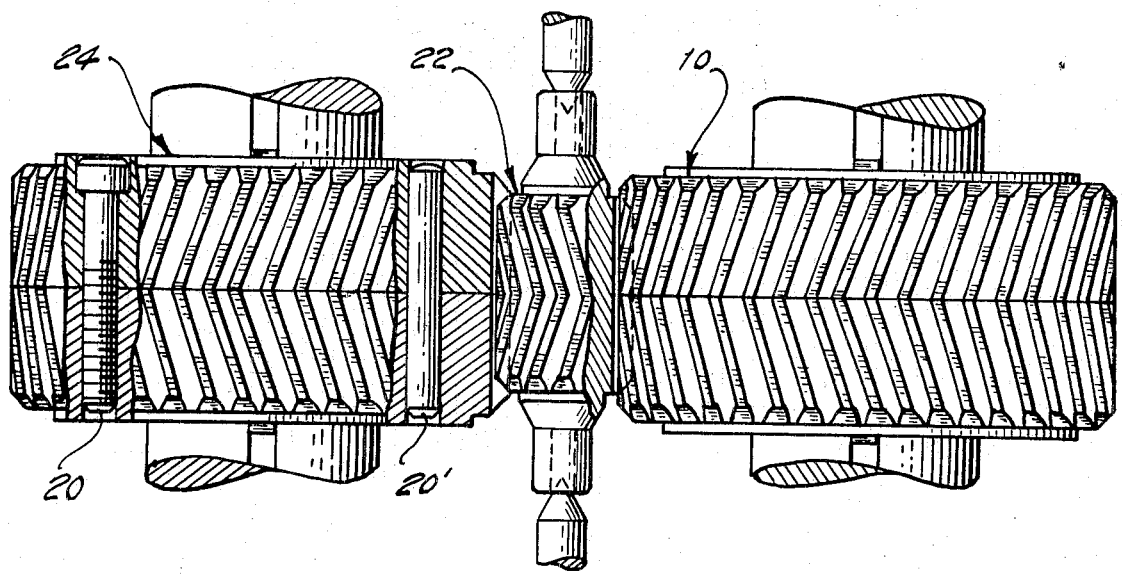
FIG. 8 shows an assembly view of two rolling dies in meshing engagement with a gear or pinion blank during a rolling operation.

In FIGS. 1 and 8, numeral 10 designates a composite die assembly. It comprises a first part 12 on which is formed helical gear teeth 14 having a left-hand helix angle. Situated directly adjacent part 12 is a second die part 16, which also is formed with helical gear teeth on its periphery as shown at 18. The teeth 18, however, are formed with a right-hand helix angle as distinguished from the left-hand helix angle of the gear teeth 14.

The juxtaposed sides of the parts 12 and 16 are machined flat so that one side of the teeth 18 will register with adjacent sides of the teeth 14, thereby forming a continuous, chevron-shaped, herringbone gear tooth. The die parts 12 and 14 are pinned together by suitable pins 20. Clamping bolts may be used to hold the parts in assembled relationship.

When the die 10 is mounted on an arbor as indicated, for example, in FIGS. 8, 3A and 3B, it may be rotated as it advances toward a gear blank. As indicated at 22 in FIG. 8, a second herringbone gear die 24 situated in the plane of rotation of the die 10 also is adapted to mesh with the gear blank 22. As the axes of rotation of the dies 10 and 24 are brought together, metal is displaced from the gear blank 22 in the manner described, for examples, in co-pending application S.N. 516,929, filed December 28, 1965 (now Pat. No. 3,362,059) which is assigned to the assignee of my instant invention.

The dies may be brought together by mounting one die for rotation about a fixed axis and by mounting the other die on a movable axis that is connected drivably to a fluid pressure ram.

During the rolling operation, metal in the gear blank is caused to flow on the drive side of the gear blank from the root of the tooth toward the pitch circle. Metal flows also on the drive side of the gear tooth from the addendum circle toward the pitch circle. On the coast side of the gear tooth the metal tends to flow in the opposite direction. A build-up of metal occurs at the fillet or root circle of the gear tooth on the coast side as metal is displaced from the region of the pitch diameter toward the root. Metal is displaced also from the region of the pitch diameter on the coast side of the tooth toward the addendum circle. This metal causes a slight ridge on the tip of the tooth. But since this ridge forms no part of the action face of the tooth, it will not adversely affect gear performance. If the ridge proves to be undesirable for any reason, it readily may be removed by grinding.

A finished pinion or gear is shown in FIG. 3A, together with the appropriate gear geometry. The gear blank is preferably formed with a central bore prior to the rolling operation. It then is mounted on the spindle as indicated, for example, in schematic form in FIG. 8. The gear tooth characteristics are indicated in FIG. 4 for the gear of FIG. 3B. It is intended that this is merely illustrative of one gear. The data of FIG. 4 may vary, of course, depending upon the characteristics that are desired.

Figure 5:
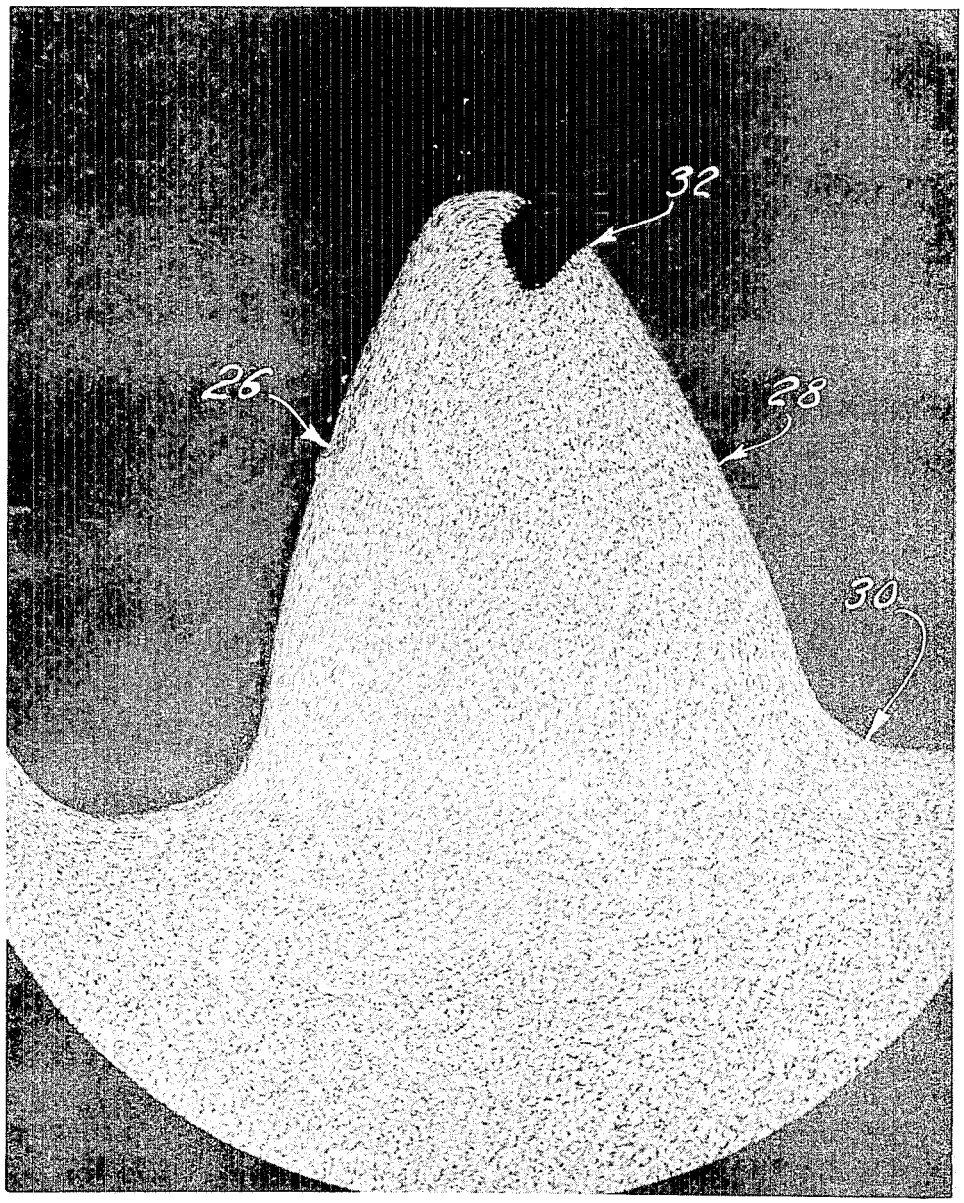
FIG. 5 is a photomicrograph showing a section of a gear tooth for the FIG. 3 pinion taken through its apex in the plane of rotation.

FIG. 5 shows a micrograph sectional view through the apex of a rolled tooth in the plane of rotation of the gear. It shows evidence of metal flow on both the driven side of the gear 26 and the coast side 28. Metal flow at the region of the fillet 3— also can be observed readily from the flow lines indicated by the grain in the etching. The excess meal due to metal flow at the tip of the gear tooth is indicated at 32.

Figure 6:
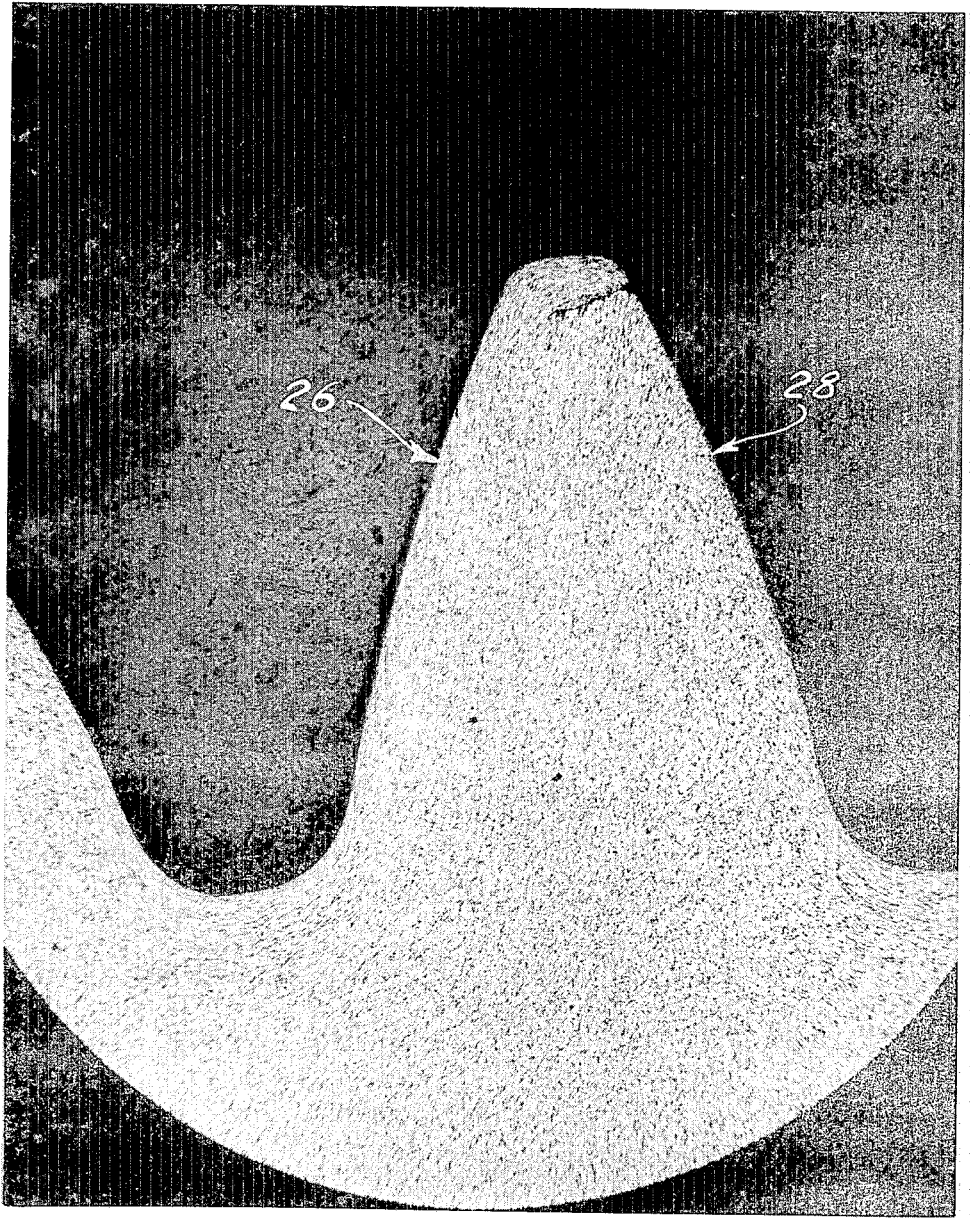
FIG. 6 is a photomicrograph of a gear tooth for the FIG. 3 pinion taken along a section spaced laterally from the apex in a direction normal to the tooth.
Figure 7:
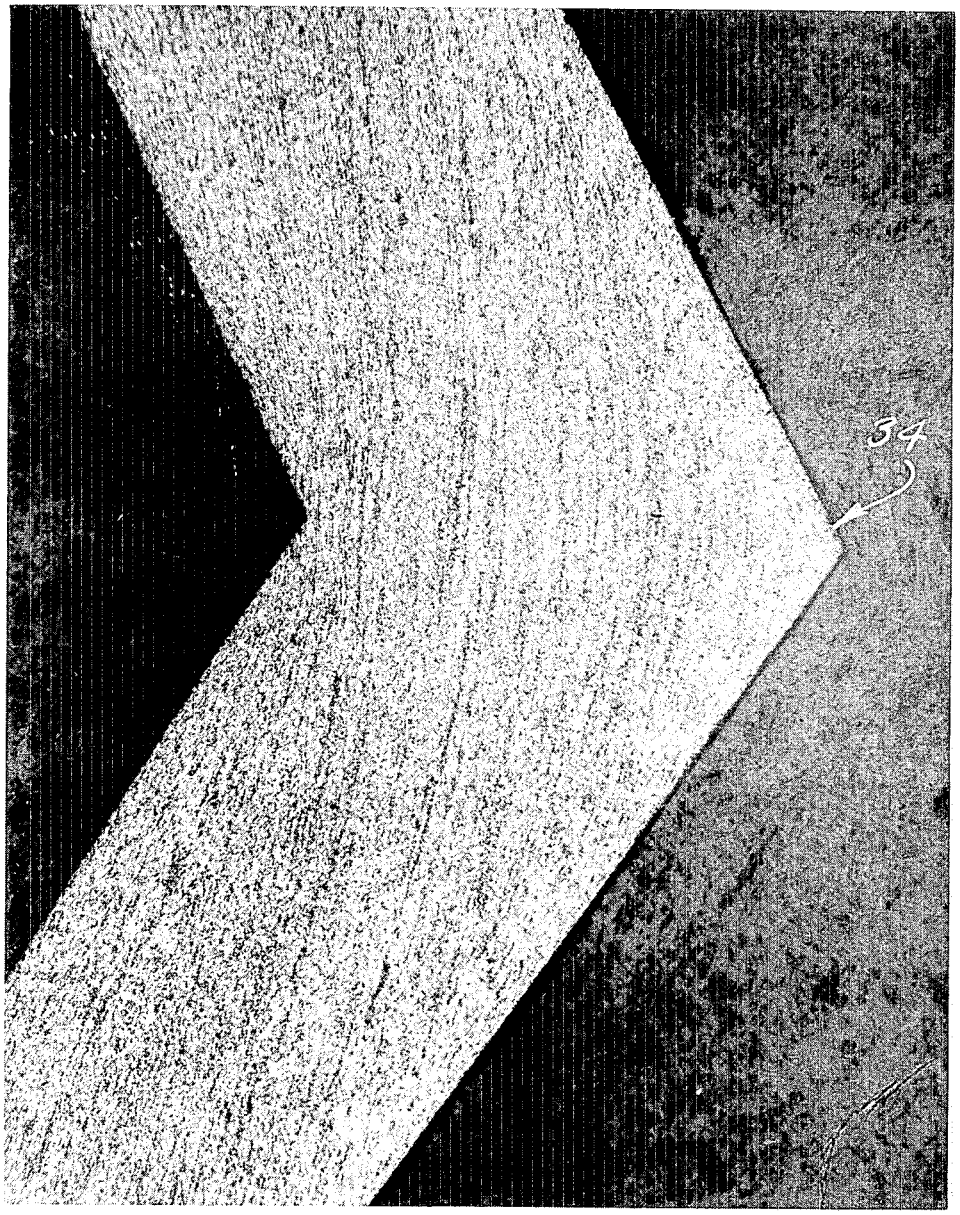
FIG. 7 is a photomicrograph of a gear tooth for the FIG. 3 pinion along a tangential section taken through the apex at the pitch diameter of the gear.

FIG. 6 shows a micro section similar to FIG. 5, although it is taken on a plane normal to the helix rather than on a plane parallel to the plane of rotation of the gear. It shows the same evidence of metal flow on both the driven side and on the coast side of the tooth. In FIG. 7 I have shown a micrograph section through the apex of a tooth in a plane tangent to the tooth pitch diameter. This indicates merely metal flow across the apex of the tooth. The apex, which is indicated at 34, conforms to the apex of the die teeth defined by the juxtaposition of the die tooth parts. Although the die teeth have a parting line at the juncture of the two die parts, there is no evidence of a parting line in the finished tooth of the gear.

As indicated earlier with reference to FIG. 7, metal flows from one side of the apex to the other as it is displaced radially outwardly and radially inwardly from the region of the pitch plane to produce a continuous, herringbone gear tooth of continuous granular consistencey and with precision dimensions. The working surfaces of the tooth are free of discontinuities and are formed with a finish having a higher degree of polish than that which is formed in conventional gear forming techniques by shaving cutters.

The involute form can be provided with a double modification of the pressure angles on the die such as that which is described in co-pending application Ser. No. 516,929, now U.S. Pat. No. 3,363,059. Further, to avoid possible interference at the apex of he acute and obtuse sides, each die could be provided with a negative crown or cavity of several thousands of an inch in its helix teeth so that a positive crown would be imparted to the rolled work piece.

It is possible also to roll several herringbone gear tooth sets on any given blank such as would be the case with a cluster gear assembly. The only limitation in this respect is the width of the dies employed for the various gear diameters.

Having thus described a preferred form of my invention, what I claim and desire to secure by U.S. Letters Patent is:

1. A gear rolling die set comprising a pair of circular dies, each die having herringbone die teeth formed on its periphery, each die comprising a pair of helical gear parts, one gear part having formed thereon right-hand helical teeth, the other gear part having formed thereon left-hand helical teeth, one side of each gear part being formed with a flat surface extending from a region below the root circle of its teeth to the addendum circle thereof, the flat surfaces of said gear parts being joined together in abutting relationship, said gear parts being mounted on a common axis, means for securing together said die parts to form a unitary die assembly with the right-hand teeth and the left-hand teeth of said gear parts forming herringbone die teeth with the apex of said herringbone die teeth being located in the plane of said abutting surfaces, each herringbone die tooth forming a continuous chevron, one side of the chevron being defined by a helical gear tooth on one gear part and the other side of the chevron being formed by the helical gear tooth on the adjacent gear part, the ends of said chevron parts terminating in a radial plane, the end plane surfaces of said chevron parts being juxtaposed in abutting relationship to form a continuous apex region, the working faces of said herringbone teeth defining modified involute forms that are compensated to accommodate the metal flow on het working faces of the teeth of a rolled gear workpiece during rooling, the axis of one die being in parallel disposition with respect to the axis of the other die, said dies being adapted to receive therebetween a gear workpiece whereby said dies displaces metal on the workpiece when the center distance betwen said dies is reduced.

References Cited

UNITED STATES PATENTS

| | | | |
|---|---|---|---|
| 132,899 | 11/1872 | Comly | 72—69 |
| 1,145,996 | 7/1915 | Julian | 29—125 |
| 1,568,648 | 1/1926 | White | 72—102 |
| 3,261,192 | 7/1966 | Tadashi Saito, et al. | 72—106 |

FOREIGN PATENTS

| | | |
|---|---|---|
| 149,938 | 7/1921 | Great Britain. |

LOWELL A. LARSON, Primary Examiner

U.S. Cl. X.R.

72—102; 29—159.2